(12) United States Patent
Thoma

(10) Patent No.: US 6,612,008 B1
(45) Date of Patent: Sep. 2, 2003

(54) METHOD AND DEVICE FOR MOBILE ON THE SPOT PRODUCTION OF SEALING ELEMENTS

(76) Inventor: Norbert Thoma, Industriestrasse 7, D-90584 Allersberg (DE)

( * ) Notice: Subject to any disclaimer, the term of this patent is extended or adjusted under 35 U.S.C. 154(b) by 0 days.

(21) Appl. No.: 09/774,190

(22) PCT Filed: Jul. 6, 1999

(86) PCT No.: PCT/DE99/02088

§ 371 (c)(1),
(2), (4) Date: Feb. 6, 2001

(87) PCT Pub. No.: WO00/01214

PCT Pub. Date: Jan. 13, 2000

(30) Foreign Application Priority Data

Jul. 7, 1998 (DE) .......................... 198 30 226

(51) Int. Cl.[7] .............................................. B23P 23/00
(52) U.S. Cl. ............................... 29/402.02; 29/402.08; 296/24.1
(58) Field of Search .................... 29/402.02, 402.08, 29/564; 296/24.1

(56) References Cited

U.S. PATENT DOCUMENTS

| | | | | |
|---|---|---|---|---|
| 2,192,207 A | * | 3/1940 | Stahl ........................... 296/64 |
| D166,530 S | * | 4/1952 | Couse .......................... D14/4.8 |
| 3,633,970 A | * | 1/1972 | Langhals ..................... 296/24.1 |
| 3,697,123 A | * | 10/1972 | Gygrynuk ................... 296/24.1 |
| 3,844,158 A | * | 10/1974 | Mercer ........................ 72/455 |
| 4,055,206 A | * | 10/1977 | Griffin ......................... 144/285 |
| 4,133,572 A | * | 1/1979 | Robbins et al. .............. 296/168 |
| 4,362,329 A | | 12/1982 | Laube et al. |
| 4,516,308 A | * | 5/1985 | Urban .......................... 29/564 |
| 4,643,476 A | | 2/1987 | Montgerard |
| 4,919,477 A | * | 4/1990 | Bingham et al. ........... 296/24.1 |
| 4,981,318 A | * | 1/1991 | Doane et al. ............... 296/24.1 |
| 5,106,141 A | * | 4/1992 | Mostashari ................. 296/24.1 |
| 5,197,774 A | * | 3/1993 | Diaz ........................... 296/24.1 |
| 5,791,713 A | * | 8/1998 | Dubuc ........................ 296/24.1 |
| 5,833,294 A | * | 11/1998 | Williams et al. ........... 296/24.1 |
| 5,853,215 A | * | 12/1998 | Lowery ...................... 296/24.1 |
| 6,325,435 B1 | * | 12/2001 | Dubuc ........................ 296/24.1 |
| 6,345,853 B1 | * | 2/2002 | Price, Jr. et al. ........... 296/24.1 |
| 6,394,523 B1 | * | 5/2002 | Yoo et al. .................. 296/24.1 |
| 6,431,628 B1 | * | 8/2002 | Bell, Jr. ..................... 296/24.1 |
| 6,497,442 B1 | * | 12/2002 | Wacker ...................... 296/24.1 |
| 2002/0060466 A1 | * | 5/2002 | Toyoda ...................... 296/24.1 |

FOREIGN PATENT DOCUMENTS

| | | |
|---|---|---|
| DE | 298 01 732 | 4/1998 |
| WO | WO 98/04434 | 2/1998 |

* cited by examiner

Primary Examiner—Gregory Vidovich
Assistant Examiner—Essama Omgba
(74) Attorney, Agent, or Firm—Hoffman, Wasson & Gitler, P.C.

(57) ABSTRACT

For providing machine-made and individually fabricated seals and gaskets on the spot a seal or gasket fabricating machine is adapted to the dimensions and conditions of a mobile van-type service vehicle, and is installed within the van-part of the vehicle. The vehicle's van part receives shelves for tools, raw materials for seals and gaskets, service station equipment and driving means independent from the place of use for the seal or gasket fabricating machine. The vehicle with the machine is driven to the location of demand, and the required seal or gasket is fabricated on the spot.

2 Claims, 1 Drawing Sheet

METHOD AND DEVICE FOR MOBILE ON THE SPOT PRODUCTION OF SEALING ELEMENTS

Figure 1:
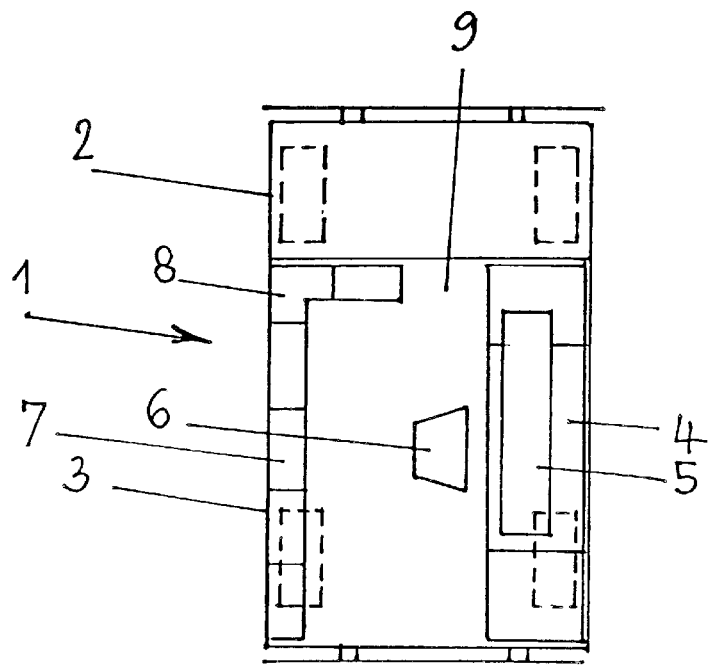

This invention refers to a method and a system for providing and supplying machine-made, individually fabricated seals or gaskets.

From DE 298 01 732 U a mobile service vehicle is known which has a box-like truck area the interior of which forms a service bay separated from the driver's cabin, which service bay houses a working bench with machining equipment, such as grinding machines for sharpening tools, which allow to sharpen the medical tools at the worksite, namely close to a hospital or a doctor's practice. The vehicle is designed so that it has spare tools onboard which are offered to the doctors as long as the tools owned by the hospital or the practice are sharpened or machined in the required manner, and accordingly, are not available for use while being machined. Basically, according to this system the tools are exchanged and during exchange the hospital's tools are sharpened so that the hospital's own tools do not need to be transported to a distant shop or service station for sharpening which would mean dead times for using the tools.

WO 98/04434 discloses a mobile fabrication unit of fabricating surface construction materials. The vehicle is driven close to the location, at which the product to be produced by the machine will be required the product is manufactured according to a master product which in view of the large size of the product to be fabricated is complicated to be transported so that larger distance between the vehicle and the place of assembly of the product can be avoided. The manufacturing system is adapted to the mobile vehicle which is of considerable dimensions and includes extensive technical equipment, such as air conditioning system, processing machines of large dimensions and the like which substantially are within the relatively large dimensions of the products to be fabricated (the length may be up to 4 m).

Seals and gaskets of different sizes and/or different types and makes are fabricated by large special machines in stock, are stored in a factory or alternatively in retail shops, and are ordered by the user of demand. This is disadvantageous because the seal or gasket is to be replaced when damaged so that there is a considerable expenditure in obtaining, receiving and replacing such seals or gaskets. The damaged seals or gaskets which are to be replaced, are to be transported by a courier so that the transport from the place of fabrication or store to the user is very time and cost-consuming. The alternative would be that the user stores replacement seals or gaskets himself which is expensive, too, because there are many types of seals or gaskets to be kept in store, and because with longer storing periods the quality of the seals or gaskets will decrease.

It is an object of this invention to fabricate seals or gaskets or similar sealing elements individually and especially adapted to the specific requirements in time at the location of use, and to produce technical products which during the operation in machines or systems are deteriorated or are leaking, and which are to be replaced as soon as possible by new seals or gaskets in order to keep the time period, within which the machine or system cannot operate, as small as possible.

According to the subject invention this problem is solved by a seal or gasket fabricating system using machines, the dimensions and conditions of which are adapted to a mobile service vehicle, are stationary fastened within the vehicle, and by driving the fabricating machines onboard of the service vehicle to the site of use the required seals or gaskets can be fabricated on the spot. For example, damaged or leaking seals or gaskets can be fabricated equivalent to the original without any considerable delay within a very short time period at the location of use, during a working break, in the evening or at any other time so that the operation of the machine or the system is interrupted only over a very limited time period or not at all. This type of vehicle is especially designed as a service vehicle which includes all required machine-type equipment, tools and materials necessary for fabricating the seals or gaskets, and is operated as a mobile seal or gasket fabricating unit. This invention allows fabricating, assembling and testing of the seal or gasket at the location of use. If the seal or gasket does not fit, or if the seal or gasket is damaged at the time of or subsequent to the assembly, it can be fabricated once more based on the characteristics of the gasket fabricated beforehand, without any serious loss of time.

Conventional and nowadays available stationary machines for fabricating sealing elements and gaskets according to the subject invention are designed in agreement with the dimensions of a service vehicle, or are newly designed from the beginning, and are adapted to the conditions of installation of the vehicle, if required. Basically, a complete mini-workshop is installed within the van-part of the service vehicle which besides of the actual sealing and gasket fabricating machine, such as a CNC lathe, is provided with shelves for receiving the different types and sizes of blanks of material to be used for fabricating the sealing elements and gaskets, the lathe tools required for fabricating the seals or gaskets, as well all required tools and equipment. Furthermore, the machine is designed so that it can be operated from the power supply, from storage batteries or from a generator, and in this manner can be operated entirely independent from the location of use.

In order to obtain optimum working conditions the workshop of the service vehicle is jacked-up for and during the manufacturing operation, by means of hydraulically extendable bottom supports or the like so that no movements, oscillations and vibrations from outside the vehicle will be transmitted onto the working bench, the tools and the workpiece to be fabricated.

The advantage of the method and system according to the subject invention basically is that sealing elements and gaskets can be fabricated, tested, re-fabricated, if required, and installed exactly at the time of demand and on the spot if there is any problem subsequent to the assembly or if it is necessary to substitute the sealing element or the gasket, so that this solution is an optimum for the customers who do no longer need to store a variety of sealing elements or gaskets on stock in an expensive manner. If necessary, the sealing elements or gaskets according to the customer's demands also can be fabricated on the spot in an altered or improved shape. In an emergency case the customer merely needs to phone the operator of the mobile service vehicle. The time for driving the vehicle to the customer usually is compensated by the time necessary for disassembling the damaged gasket or sealing element so that delays caused by stagnation practically are neglectable. In this manner, the customer does no longer need to store any sealing elements or gaskets so that the customer's expenses insofar are restricted to emergency cases.

Figure 2:
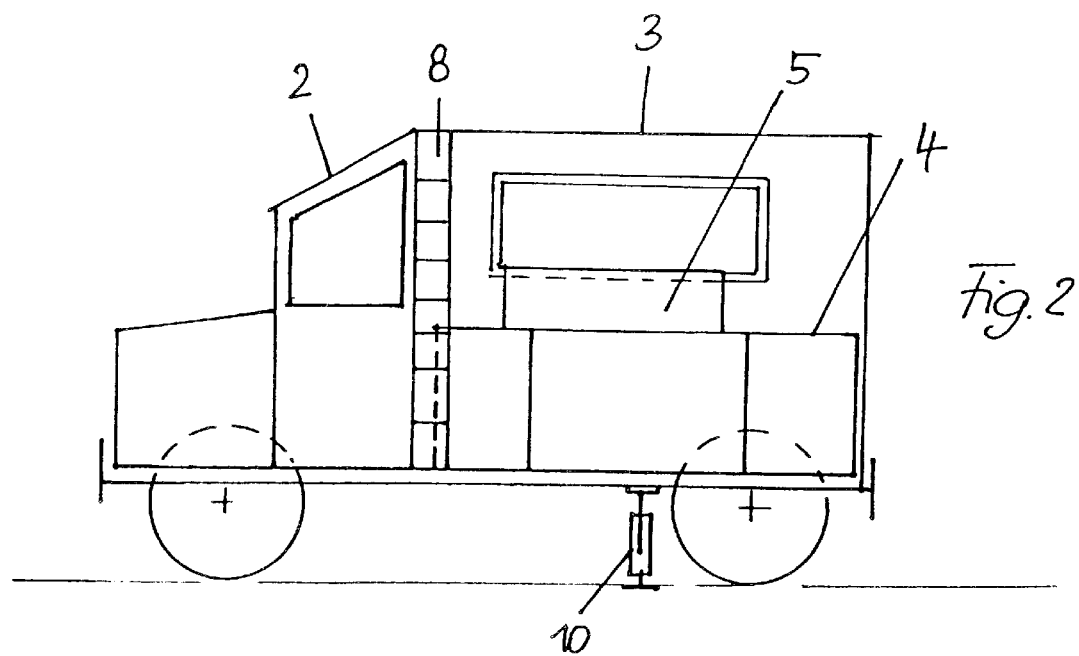

Other objects and features of the present invention will become apparent from the following description in connection with the drawings in which:

FIG. 1 shows a schematic plan view of an embodiment of a service vehicle according to the invention, and FIG. 2 shows a schematic lateral view of the service vehicle according to FIG. 1.

A service vehicle 1 houses the driver's cabin 2 and the vehicle's superstructure 3. The superstructure is a box or van-like truck area which is the working or service station, and is provided with a workbench 4 with a special lathe 5 mounted thereon by means of which the sealing elements or gaskets are manufactured; the lathe is arranged on one longitudinal side or the rear side of the vehicle which side has a window. Associated to the workbench 4 is an operator's place 6 which is schematically drawn as a seat. On the opposite side of the superstructure 3 shelves 7 and at the front side associated to the driver's cabin, or alternatively at the rear side further shelves or equipement are provided. Between the driver's cabin 2 and the superstructure 3 a passage 9 is shown. The shelves 7, 8 at the lateral wall and the front restriction to the driver's cabin receive the required working material for the sealing elements, the tools for fabricating the sealing elements and for operating the lathe and any other materials or equipment are basically storage shelves.

The floor of the superstructure is supported by means of pneumatically, hydraulically, or mechanically operated support legs or jack-up means which compensate the suspension of the vehicle and prevent that damaging movements of the vehicle are transmitted to the workbench and thus to the manufacturing equipment and tools, preferably the lathe in order to guaranty high precision of fabrication.

What is claimed is:

1. A method of fabricating machine-made and individually manufactured sealing elements or gaskets on the spot comprising:

fitting a sealing element and gasket fabricating machine to the dimensions of a mobile vehicle and arranged stationarily within the mobile vehicle, driving to a location where a new sealing element or gasket is in demand, and fabricating a sealing element or gasket on the spot, and installing the sealing element or gasket wherein the sealing element and gasket fabricating machine is a modular lathe center arranged within a cargo section of the vehicle, the dimensions of which are designed according to the cargo section of the vehicle.

2. The method according to claim 1, further comprising arranging materials for manufacturing the sealing elements or gaskets, tools for making different sizes and types of sealing elements and gaskets.

* * * * *